United States Patent
Singh et al.

(10) Patent No.: US 12,555,277 B2
(45) Date of Patent: Feb. 17, 2026

(54) VISIBILITY COLOR RECOMMENDATION SYSTEM

(71) Applicant: Adobe Inc., San Jose, CA (US)

(72) Inventors: Alok Kumar Singh, Noida (IN); Shikhar Garg, New Delhi (IN); Saikat Chakrabarty, Noida (IN)

(73) Assignee: Adobe Inc., San Jose, CA (US)

( * ) Notice: Subject to any disclaimer, the term of this patent is extended or adjusted under 35 U.S.C. 154(b) by 169 days.

(21) Appl. No.: 18/410,042

(22) Filed: Jan. 11, 2024

(65) Prior Publication Data

US 2025/0232488 A1 Jul. 17, 2025

(51) Int. Cl.

| | |
|---|---|
| *G06T 11/00* | (2006.01) |
| *G06F 3/048* | (2013.01) |
| *G06T 7/90* | (2017.01) |
| *G06V 10/56* | (2022.01) |
| *G06V 10/60* | (2022.01) |
| *G09G 5/02* | (2006.01) |
| *G09G 5/06* | (2006.01) |
| *H04N 1/60* | (2006.01) |
| *H04N 5/57* | (2006.01) |

(52) U.S. Cl.
CPC ............. *G06T 11/001* (2013.01); *G06T 7/90* (2017.01); *G06V 10/56* (2022.01); *G06V 10/60* (2022.01); *G06T 2207/10024* (2013.01)

(58) Field of Classification Search
CPC ........ G06T 11/001; G06T 11/20; G06T 11/60; G06T 7/90; G06T 7/40; G06T 7/44; G06T 3/10; G09G 5/02; G09G 5/06; G09G 5/10; G09G 2320/06–0666; G09G 2320/0271; G09G 2320/0276; G06V 10/56; G06V 10/60; H04N 1/60; H04N 1/6019; H04N 1/6027; H04N 5/57–58; H04N 9/64–78; H04N 5/45; G06F 3/048; G06F 3/0482; G06F 3/0484; G06F 3/04842–04845
See application file for complete search history.

(56) References Cited

U.S. PATENT DOCUMENTS

| | | | |
|---|---|---|---|
| 9,679,532 B2* | 6/2017 | Dorner | G06Q 30/0627 |
| 9,741,137 B2* | 8/2017 | Dorner | H04N 1/644 |
| 9,852,498 B2* | 12/2017 | Bako | G06T 5/77 |
| 10,109,092 B1* | 10/2018 | Hitchings, Jr. | G06T 11/60 |
| 10,789,610 B2* | 9/2020 | Smith | G06N 20/00 |
| 11,580,669 B2* | 2/2023 | Echevarria Vallespi | G06V 10/56 |
| 12,013,883 B1* | 6/2024 | Shukla | G06F 16/3323 |
| 2008/0079750 A1* | 4/2008 | Setlur | G06F 3/14 345/593 |
| 2016/0275067 A1* | 9/2016 | Mei | G06F 40/106 |
| 2019/0251710 A1* | 8/2019 | Park | G06F 3/0481 |
| 2024/0029127 A1* | 1/2024 | Bowen | G06F 21/6218 |
| 2024/0143147 A1* | 5/2024 | Clarke | G06F 3/04883 |
| 2024/0144443 A1* | 5/2024 | Sharma | G06T 5/70 |
| 2024/0153294 A1* | 5/2024 | Mondal | G06V 30/19107 |

* cited by examiner

*Primary Examiner* — Wesner Sajous
(74) *Attorney, Agent, or Firm* — FIG. 1 Patents

(57) ABSTRACT

A visibility color recommendation system includes functionality operable to receive a user input defining a glyph to be displayed along with a digital image in a user interface. A color recommendation is generated, automatically and without user intervention, based on visibility of the glyph with respect to one or more colors of the digital image. The glyph is presented in the user interface as having a color from the digital image based on the color recommendation.

20 Claims, 10 Drawing Sheets
(7 of 10 Drawing Sheet(s) Filed in Color)

VISIBILITY COLOR RECOMMENDATION SYSTEM

BACKGROUND

Image processing systems continue to increase a range of colors usable as part of digital images. As part of this, complexity of the digital images has increased to include a multitude of objects, each configurable of having a wide range of colors. Consequently, numerous technical challenges are encountered due to this complexity, an example of which is object visibility within the digital image.

A digital image, for instance, may include a complex background having a variety of colors. Accordingly, inclusion of an object in relation to this complex background may be challenged in instances involving visibility of the object. Text, for instance, that is to be included as part of the digital image may have decreased visibility due to this complexity. Conventional techniques used to address this technical challenge rely on manual configuration of the text, which involves specialized knowledge, is prone to error, and typically results in visual inconsistencies with respect to the digital image. Accordingly, computing devices utilized to implement these conventional techniques result in inefficient consumption of computing resources and power consumption involved in implementing these conventional techniques.

SUMMARY

A visibility color recommendation system includes functionality operable to receive a user input defining a glyph to be displayed along with a digital image in a user interface. A color recommendation is generated, automatically and without user intervention, based on visibility of the glyph with respect to one or more colors of the digital image. The glyph is presented in the user interface as having a color from the digital image based on the color recommendation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
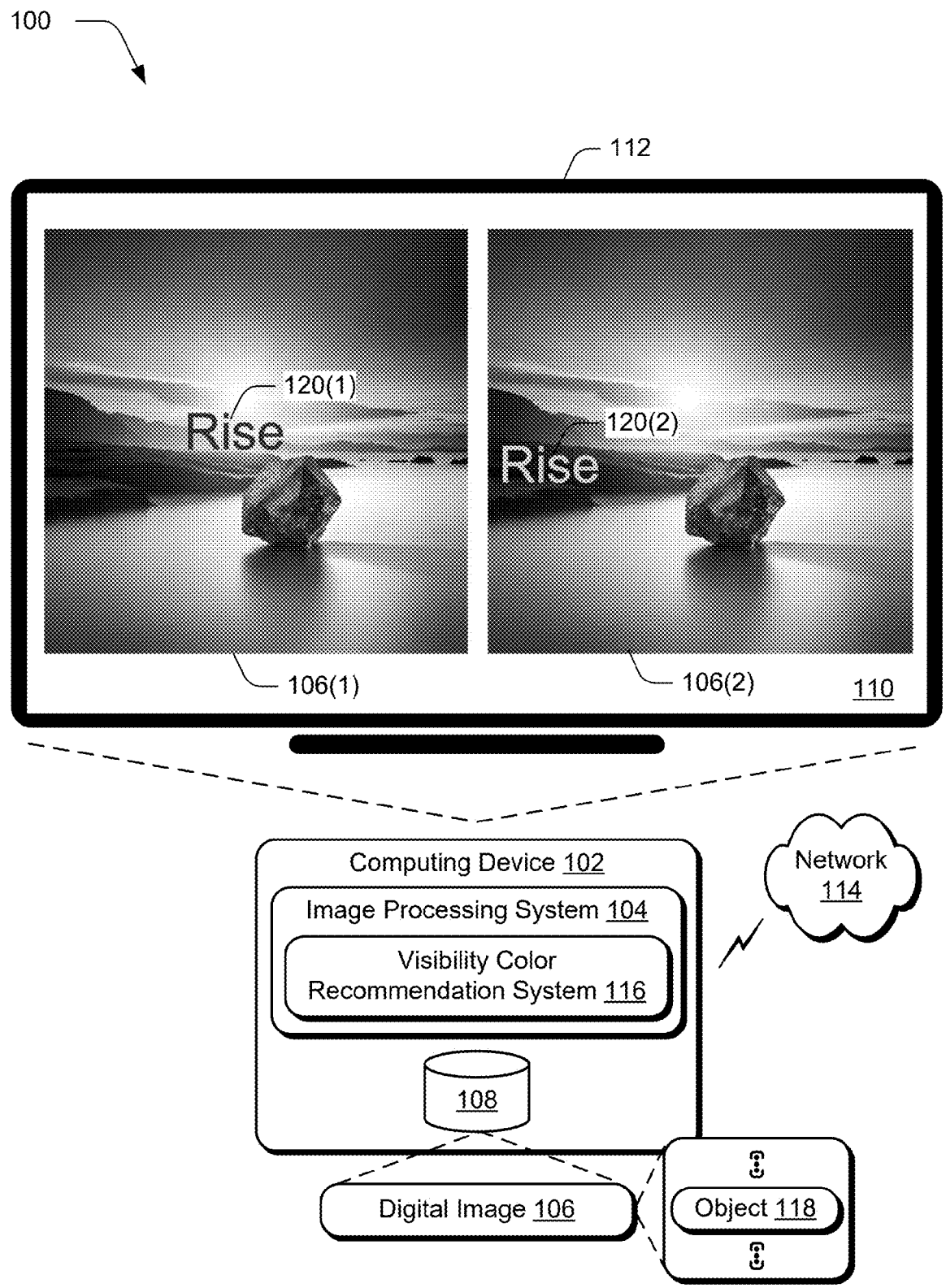
FIG. 1 is an illustration of a digital medium environment in an example implementation that is operable to employ visibility color recommendation techniques and systems described herein.

Inclusion of a variety of colors within a digital image introduces technical challenges with respect to visibility of objects as part of the digital image. In some instances, the objects are configured to blend together, e.g., to provide a background. In other instances, however, visibility of the object is intended to stand out in relation to other objects in the digital image. An example of desired object legibility often involves text, in which, the text is intended to be legible with respect to a background formed by the digital image and therefore readable by a viewer of the digital image.

Conventional techniques to address these technical challenges, however, are typically implemented manually, thereby involving specialized knowledge and/or guesswork involving trial and error to achieve a desired result. Although additional techniques have been developed to assist in these technical challenges, these additional techniques are also prone to error and visual inconsistencies, e.g., caused by a lack of visual harmony with the digital image. As such, conventional techniques typically result in significant computing device resource, are slow (i.e., do not support real-time operation), and result in significant power consumption.

Accordingly, a visibility color recommendation system is described. The visibility color recommendation system is configurable to generate a color recommendation for an object based on other objects included in the digital image, e.g., as a background of the digital image. The visibility color recommendation system does so, in one or more examples, in a manner that promotes visibility of the object as well as harmonizes an appearance of the object with respect to other objects included in the digital image, automatically and without user intervention. As a result, the color recommendation improves computation efficiency as part of inclusion of objects within the digital image as well as user efficiency in the design of the digital image.

The visibility color recommendation system, for instance, receives an input indicating a portion of a digital image, over which, an object (e.g., text) is to be displayed with respect to a digital image. The input may be entered as a click-and-drag using a cursor control device or gesture, a tap, a spoken utterance (e.g., "place text in bottom-left corner"), and so forth. In response, the visibility color recommendation system first determines which colors are included in the portion as part of forming an input color palette. To do so, the visibility color recommendation system extracts an input color palette having hues that are included in the portion.

A hue refers to a dominant wavelength of light that imparts a basic identity to color, e.g., red, blue, yellow, green, etc. Hue is one of the three primary attributes of perceived color, the others being saturation and brightness. Color, on the other hand, refers to additional aspects of visual sensation that include hue as well as saturation (e.g., chroma), and brightness, e.g., "lightness."

A complementary color palette is then generated based on the input color palette. The complementary color palette, for instance, includes hues that are opposite to each of the hues included in the input color pallet based on a color wheel, e.g., blue and orange, red and green, yellow and purple, and so on. The complementary color palette, therefore, includes hues that exhibit a stark contrast to those included in the input color palette and as such promotes visibility of hues of the complementary color palette when displayed along with hues of the input color palette. Therefore, choosing the final hue based on the complementary color palette ensures contrast in hue space, thereby improving legibility. In this way, the visibility color recommendation system is configured to perform an initial determination as to what colors promote visibility with respect to the selected portion of the digital image.

As previously described, however, conventional techniques do not support harmonization when included with the digital image, and as such, are viewable as visual artifacts when incorporated as part of the digital image. In order to address this technical challenge, the visibility color recommendation system is configurable to harmonize a color recommendation with the digital image. The visibility color recommendation system, for instance, extracts a background color palette specifying hues included in the digital image as a background, e.g., an entirety of the digital image included within respective borders defined by the digital image.

The visibility color recommendation system then determines a color distance between one or more complementary hues selected from the complementary color palette with hues included in the background color palette. The color distance, for instance, is determined based on angular deviation between hues represented in a color wheel. In one or more examples, the visibility color recommendation system selects a hue from the complementary color palette that has a maximum sum of distances between itself and colors in the input color palette. The selected hue from the complementary color palette is then used to select a corresponding hue from the background color palette having a minimum hue distance between itself and the selected complementary hue. The corresponding hue from the background color palette is then used as a basis by the visibility color recommendation system to form the color recommendation, e.g., by further applying saturation and brightness adjustments.

In this way, the visibility color recommendation system generates a color recommendation, automatically and without user intervention, selected from the digital image (e.g., a background of the digital image) that promotes visibility of the object (e.g., text) with respect to the selected portion of the digital image. The color recommendation may be generated by the visibility color recommendation system in real time, and as such, support a variety of functionalities that are not possible in conventional techniques.

Text entered via a user interface at a first location, for instance, is configurable to have a color based a first portion of the digital image associated with the first location in a user interface. Upon selection and movement of the text, the visibility color recommendation system is configurable to generate a second color recommendation based on a second location and corresponding second portion of the digital image, to which, the text is moved. As a result, the visibility color recommendation system is configurable to respond dynamically through efficient use of computational resources in a manner that is not possible using conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Color Recommendation Environment

FIG. 1 is an illustration of a digital medium environment 100 in an example implementation that is operable to employ visibility color recommendation techniques and systems described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system. 104 is also configurable as whole or part via functionality available via the network 114, such as part of a web service or "in the cloud."

An example of functionality incorporated by the image processing system 104 to process the digital image 106 is illustrated as a visibility color recommendation system 116. The visibility color recommendation system 116 is configured to generate a color recommendation based on one or more objects 118 included in the digital image 106. The objects are configurable in a variety of ways, examples of which include raster objects (e.g., bitmaps), vector objects, and so on. Vector objects, for instance, are configurable as glyphs. Glyphs are an elemental symbol within a set of characters such as alphanumeric text (e.g., letters, numbers), punctuation marks, symbols, emojis, and so forth.

The visibility color recommendation system 116 is configured to seamlessly integrate objects as part of a graphic design of the digital image 106 by generating a color recommendation that harmonizes with an overall design and also ensures visibility on complex backgrounds. The visibility color recommendation system 116, for instance, is configurable to leverage color theory and in-depth knowledge of color spaces to craft hues, saturation, and brightness values as part of the color recommendation. The result is a well-balanced, aesthetically pleasing color that enhances design composition. The visibility color recommendation system 116, in real world implementations, is configurable to generate the color recommendation in real time, e.g., in under 0.2 seconds. Accordingly, the visibility color recommendation system 116 supports real time user interactions and responses.

In the illustrated user interface 110, for example, a first instance of a digital image 106(1) includes a first instance of an object 120(1) displayed with respect to a first portion. The visibility color recommendation system 116 generates a color recommendation having an amethyst color that matches an amethyst color of an example mineral and yet promotes visibility with respect to a sunrise disposed at the first portion. When a second instance of the object 120(2) is moved to a second location with respect to a second instance of the digital image 106(2), however, the visibility color recommendation system 116 generates a color recommendation having a color that matches a color included as part of the sunrise and yet promotes visibility with respect to a shoreline. Thus, the visibility color recommendation system 116 is functional to significantly streamline a design process in editing the digital image 106, thereby fostering improved visual communication in various domains, from web design to advertising and beyond. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Visibility Color Recommendation Generation

The following discussion describes color recommendation techniques based on visibility that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks.

Figure 10:
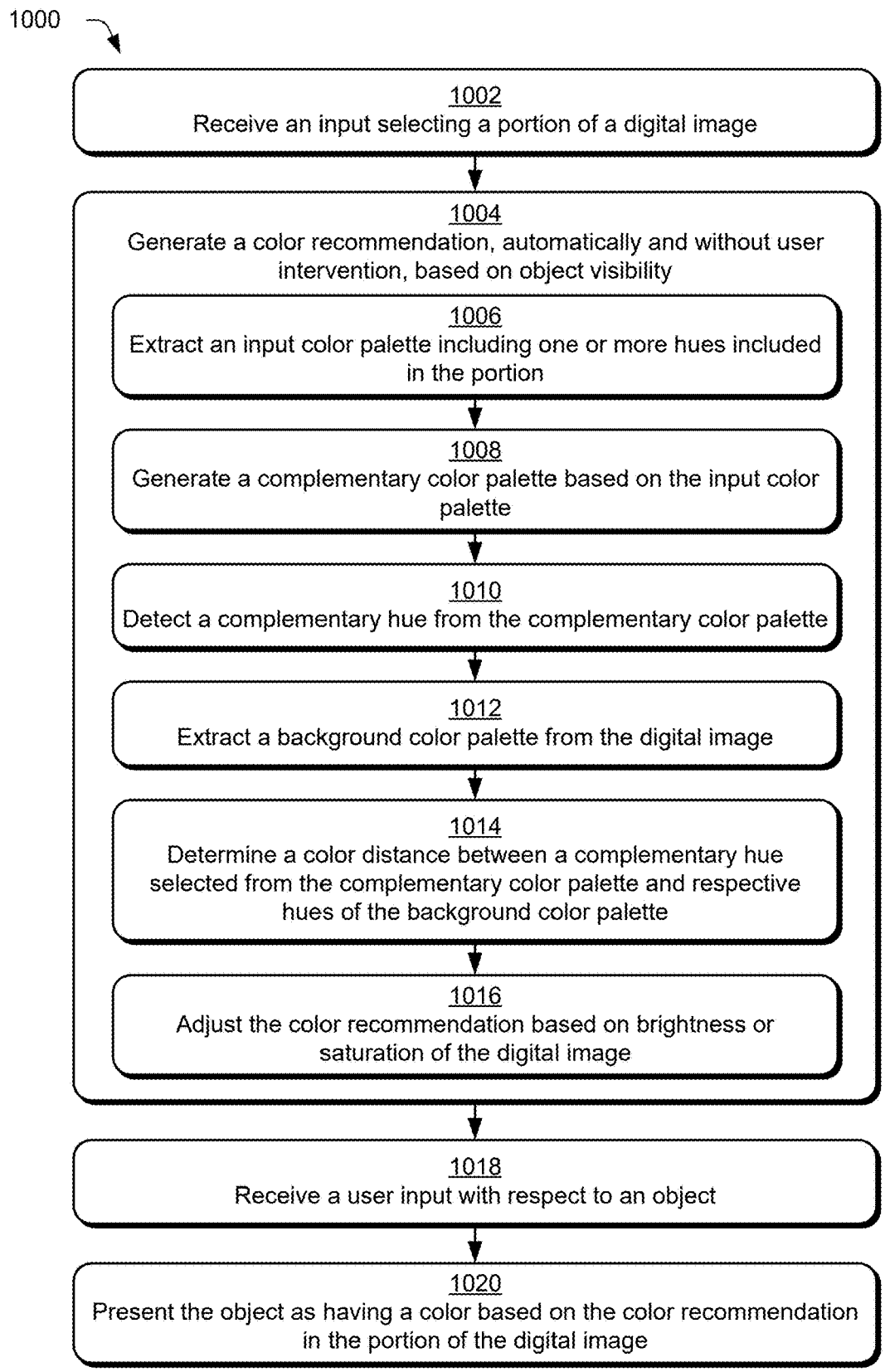
FIG. 10 is a flow diagram depicting an algorithm as a step-by-step procedure in an example implementation of operations performable for accomplishing a result of generating a color recommendation and control of an edit operation based on the color recommendation.

Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. FIG. 10 is a flow diagram depicting an algorithm 1000 as a step-by-step procedure in an example implementation of operations performable for accomplishing a result of generating a color recommendation and control of an edit operation based on the color recommendation. In portions of the following discussion, reference will be made in parallel to FIG. 10.

Figure 2:
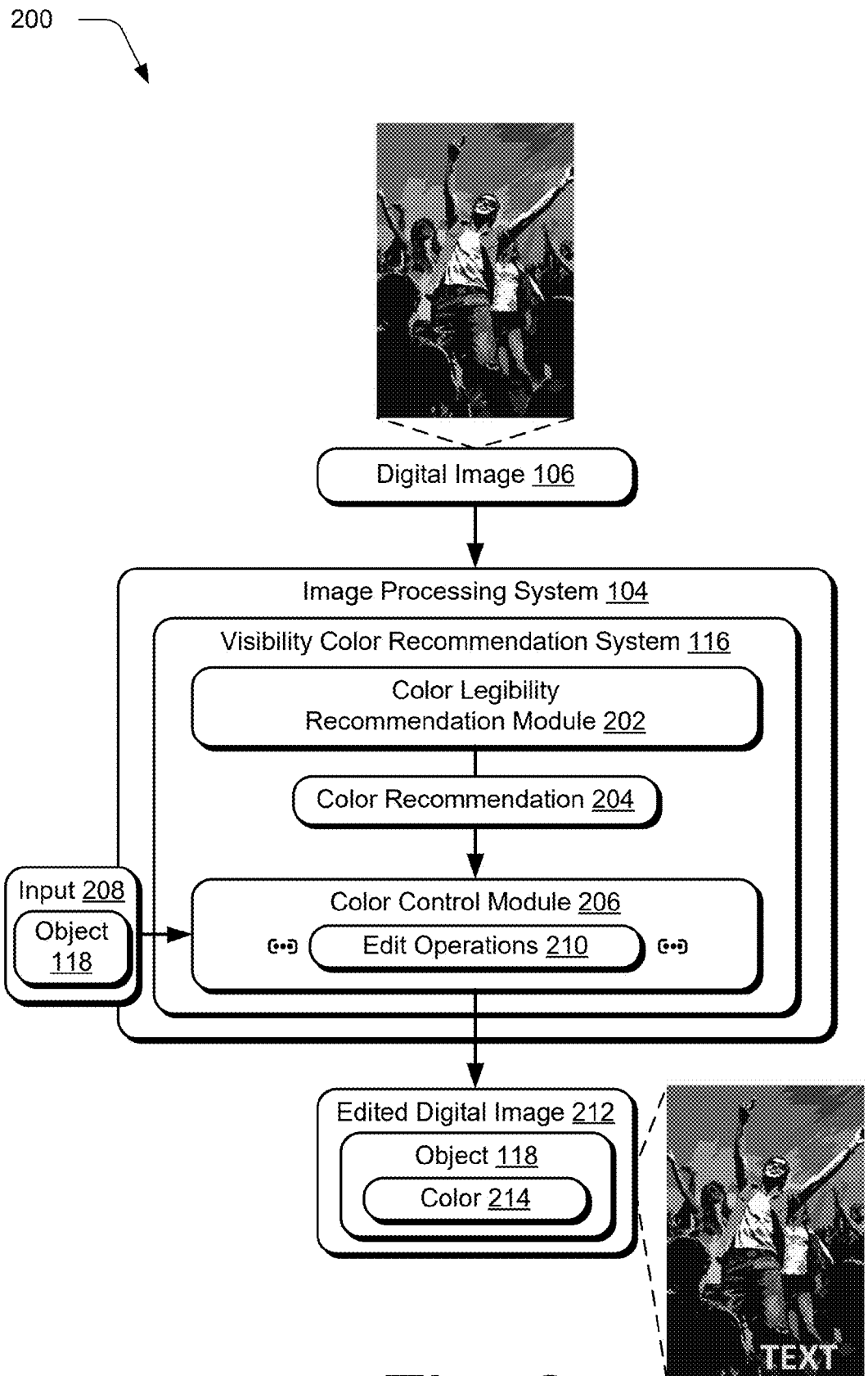
FIG. 2 depicts a system in an example implementation showing operation of the visibility color recommendation system of FIG. 1 in greater detail.

FIG. 2 depicts a system 200 in an example implementation showing operation of the visibility color recommendation system 116 of FIG. 1 in greater detail. The visibility color recommendation system 116, through use of the features described below, is configured to employ color theory as part of generating a color recommendation is less than two-hundred milliseconds and as such is viable for implementation as part of a variety of real-time operational scenarios. An example of one such scenario is illustrated as "text to template" in FIG. 2 in which the digital image 106 is configured as a template, on which, an object as text is to be added.

To do so, the visibility color recommendation system 116 includes a color legibility recommendation module 202 that is configured to generate a color recommendation 204 based on the digital image 106. An color control module 206 is then employed to leverage the color recommendation 204. The color control module 206, for instance, receives an input 208 specifying an object 118 and performs one or more edit operations 210 to generate an edited digital image 212 in which the object 118 has a color 214 based on the color recommendation 204. As part of generating the color recommendation 204, the color legibility recommendation module 202 promotes both visibility of the object as well as harmonization of a color of the object 118 with respect to the digital image 106.

Figure 3:
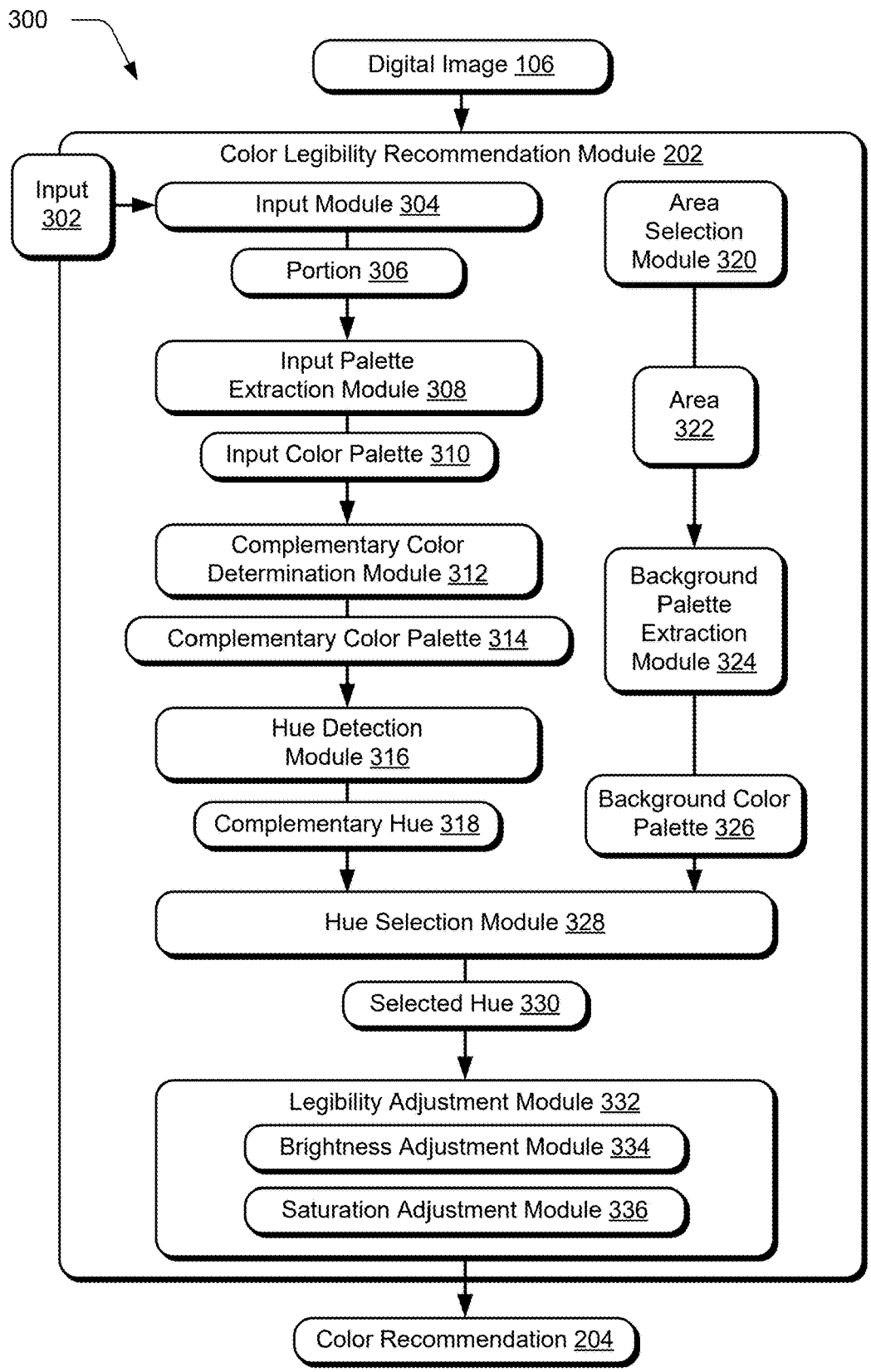
FIG. 3 depicts an example system showing operation of the color legibility recommendation module in generating a color recommendation based on a digital image.

FIG. 3 depicts an example system 300 showing operation of the color legibility recommendation module 202 in generating a color recommendation 204 based on a digital image 106. The digital image 106 is received as an input in this example, e.g., a raster image (e.g., a bitmap), vector image, and so forth.

Figure 4:
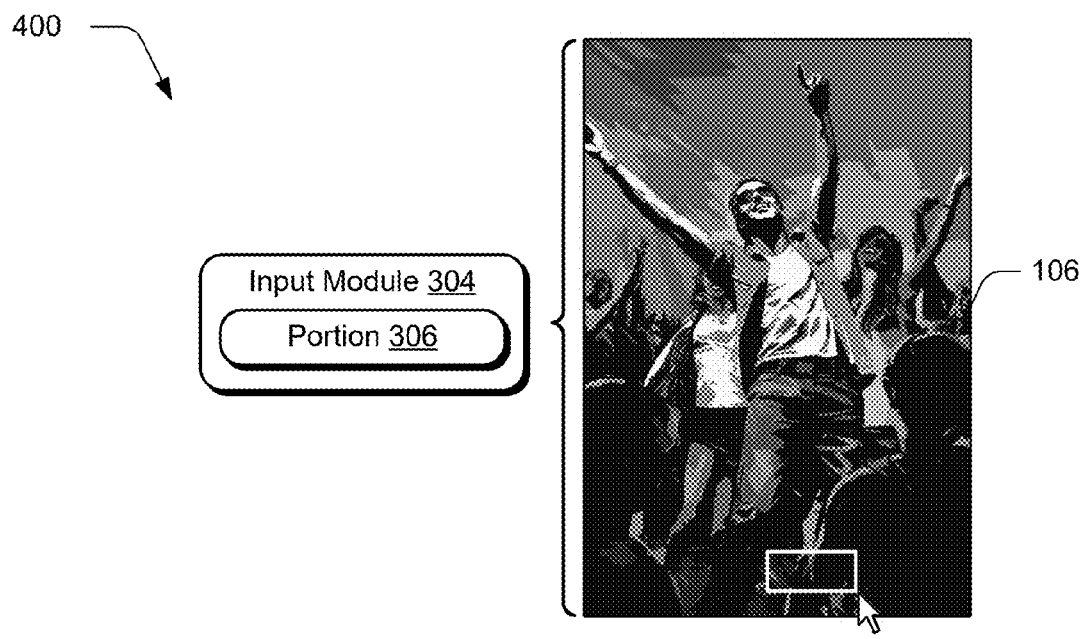
FIG. 4 depicts a system showing operation of an input module of FIG. 3 in greater detail as selecting a portion of a digital image.

An input 302 is received via an input module 304 selecting a portion 306 of a digital image 106 (block 1002). FIG. 4 depicts a system 400 showing operation of the input module 304 in greater detail as selecting a portion 306 of a digital image 106. The digital image 106 is displayable in a user interface 110. The input 302 selects the portion 306 in a variety of ways, e.g., through manipulation of a cursor to draw a bounding box as illustrated, through a gesture, and so forth. The portion 306 in this example defines a location with respect to the digital image 106 that is to be used to display an object, e.g., text. In this way, the color legibility recommendation module 202 is made aware as to characteristics of a location that is to be used to display an object.

Based on the portion 306 in this example, the color legibility recommendation module 202 generates a color recommendation 204, automatically and without user intervention, based on object visibility (block 1004). To do so in the example of FIG. 3, an input palette extraction module 308 is utilized to extract an input color palette 310. The input color palette 310 includes one or more hues included in the portion (block 1006).

The input palette extraction module 308, for instance, generates a "tight" bounding box based on the portion 306. The input palette extraction module 308 then employs a clustering technique to partition a set of data points into "k" clusters, an example of which is referred to as "k-medoids."

Figure 5:
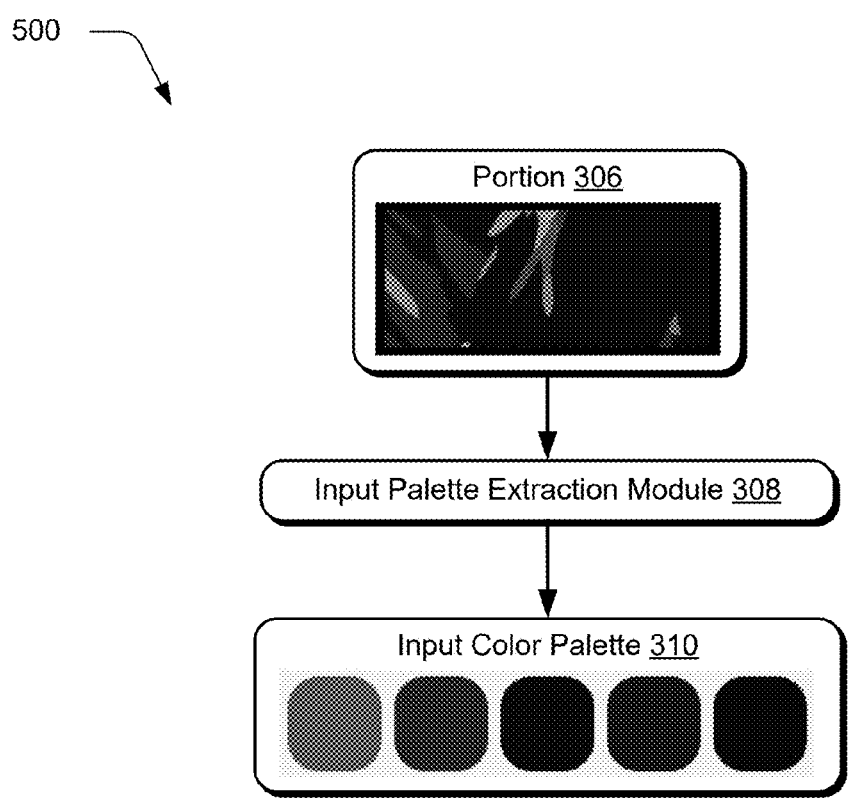
FIG. 5 depicts a system in an example implementation showing operation of an input palette extraction module of FIG. 3 in greater detail as extracting an input color palette.

FIG. 5 depicts a system 500 in an example implementation showing operation of the input palette extraction module 308 of FIG. 3 in greater detail as extracting an input color palette 310. In this example, the set of data points are hues of respective pixels included in the portion 306 of the digital image 106. The input color palette 310 is formed as a five-color palette having respective hue values in a hue, saturation, brightness (HSB) color space. Other examples are also contemplated, e.g., in a RGB color space.

The input color palette 310 is then passed from the input palette extraction module 308 as an input to a complementary color determination module 312. The complementary color determination module 312 is configured to generate a complementary color palette 314 based on the input color palette 310 (block 1008). A hue detection module 316 is then utilized to detect a complementary hue 318 from the complementary color palette 314 (block 1010) e.g., which promotes visibility with respect to the portion 306.

Figure 6:
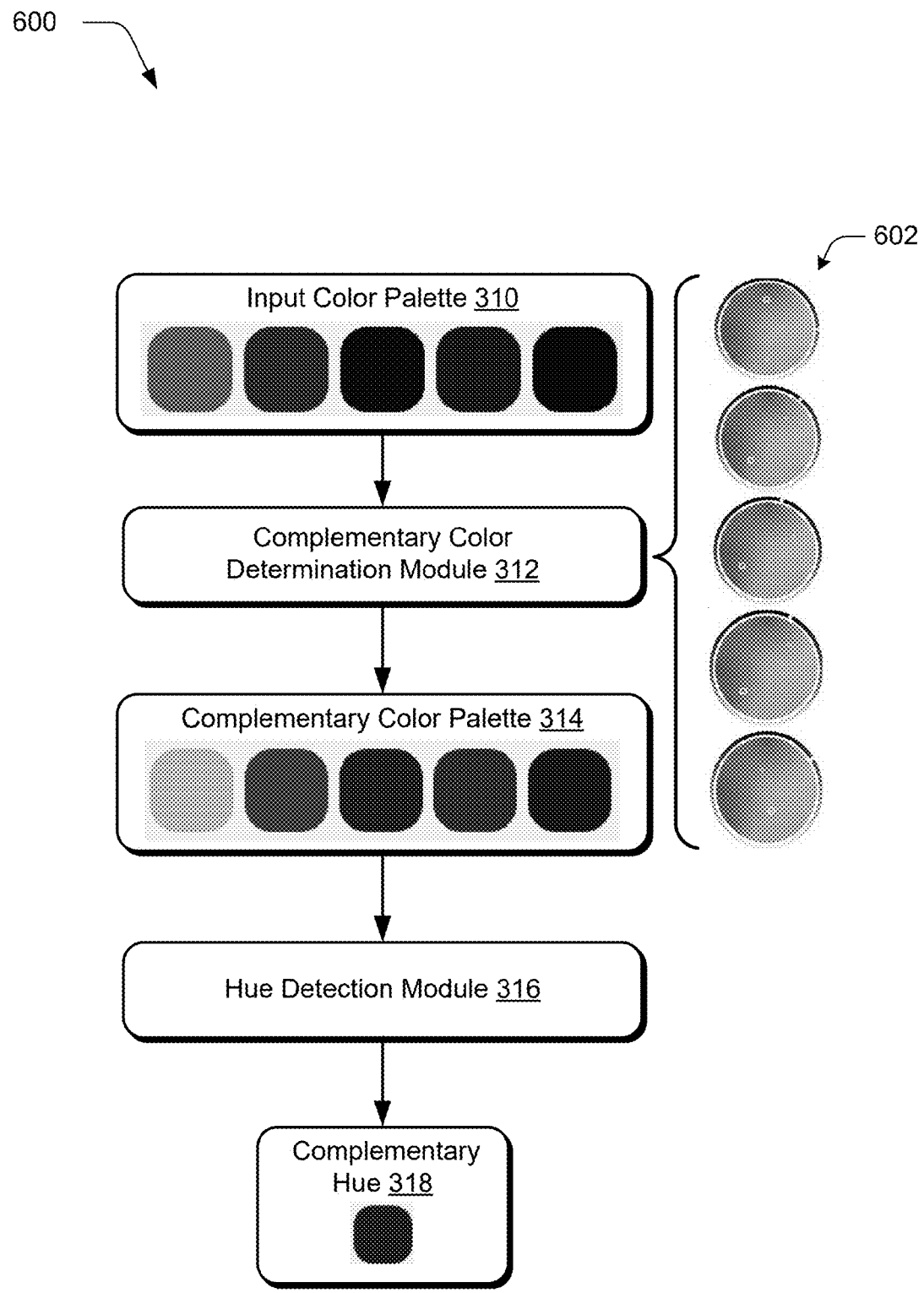
FIG. 6 depicts a system in an example implementation showing operation of a complementary color determination module and hue detection module of FIG. 3 in greater detail as generating a complementary color palette and detecting a complementary hue.

FIG. 6 depicts a system 600 in an example implementation showing operation of the complementary color determination module 312 and hue detection module 316 of FIG. 3 in greater detail as generating a complementary color palette 314 and detecting a complementary hue 318. The complementary color determination module 312 is configured to generate the complementary color palette 314 by modifying hue values of the input color palette 310 as follows. The complementary color determination module 312, for instance, is configured to find complementary colors having a maximum hue contrast with respect to an immediate background defined by the portion 306 of the digital image 106.

Continuing with the above example of a HSB color space, the complementary color determination module 312 employs a color wheel 602 such that:

$$contrast\_hue = (input\_hue + 05) \% 1$$

$$complementary\_color = (contrast\_hue, input\_saturation, input\_brightness)$$

Therefore, for an input color palette 310:

$$Input\_color\_palette = (T_1, T_2, T_3, T_4, T_5)$$

where "$T_i$" is a color in an HSB color space in the portion 306, the complementary color palette 314 of:

$$complementary\_color\_palette = (C_1, C_2, C_3, C_4, C_5)$$

is detected where "$C_i$" is a complementary color of corresponding "$T_i$" in the HSB color space. For example, for color "#d12f31" a complementary color of "#2FD1CF" is detected based on the color wheel 602 for inclusion as part of the complementary color palette 314 by the complementary color determination module 312.

The hue detection module 316 is then utilized to select the complementary hue 318 having a maximum sum of distances between itself and each of the colors in the input color palette 310. To do so, the hue detection module 316 receives the complementary color palette 314 as an input as described above:

$$complementary\_color\_palette = (C_1, C_2, C_3, C_4, C_5)$$

The hue detection module 316 then generates an output "C'_selected" which is the complementary hue 318 selected from the complementary color palette 314.

$$C^l \text{ Selected} = \max\left(\sum_{i=1}^{i=5}\sum_{j=1}^{j=5} Dist\left(C_i^l, T_j\right)\right)$$

The complementary hue 318 thus specifies the hue from the complementary color palette 314 having a maximum hue contrast with respect to the input color palette 310.

As previously described, the color legibility recommendation module 202 is also configured harmonize the color recommendation 204 with respect to the digital image 106, e.g., as a whole. To do so, an area selection module 320 is usable to select an area of the digital image 106, e.g., that includes at least a portion "outside" of the selected portion 306. The area 322, for instance, may be selected as an entirety of the digital image 106 (e.g., within borders defined by the digital image 106 as a whole), a target area 322 to be used as a basis for color harmonization, and so on.

Another color palette is then extracted based on the area 322. In the illustrated example of FIG. 3, the area 322 is a background. Therefore, a background palette extraction module 324 is employed (which may operate similar in functionality to the input palette extraction module 308) to extract a background color palette 326 (block 1012) from the digital image 106. The background color palette, in one or more implementations, includes at least one hue that is independent of hues included in the input color palette.

Figure 7:
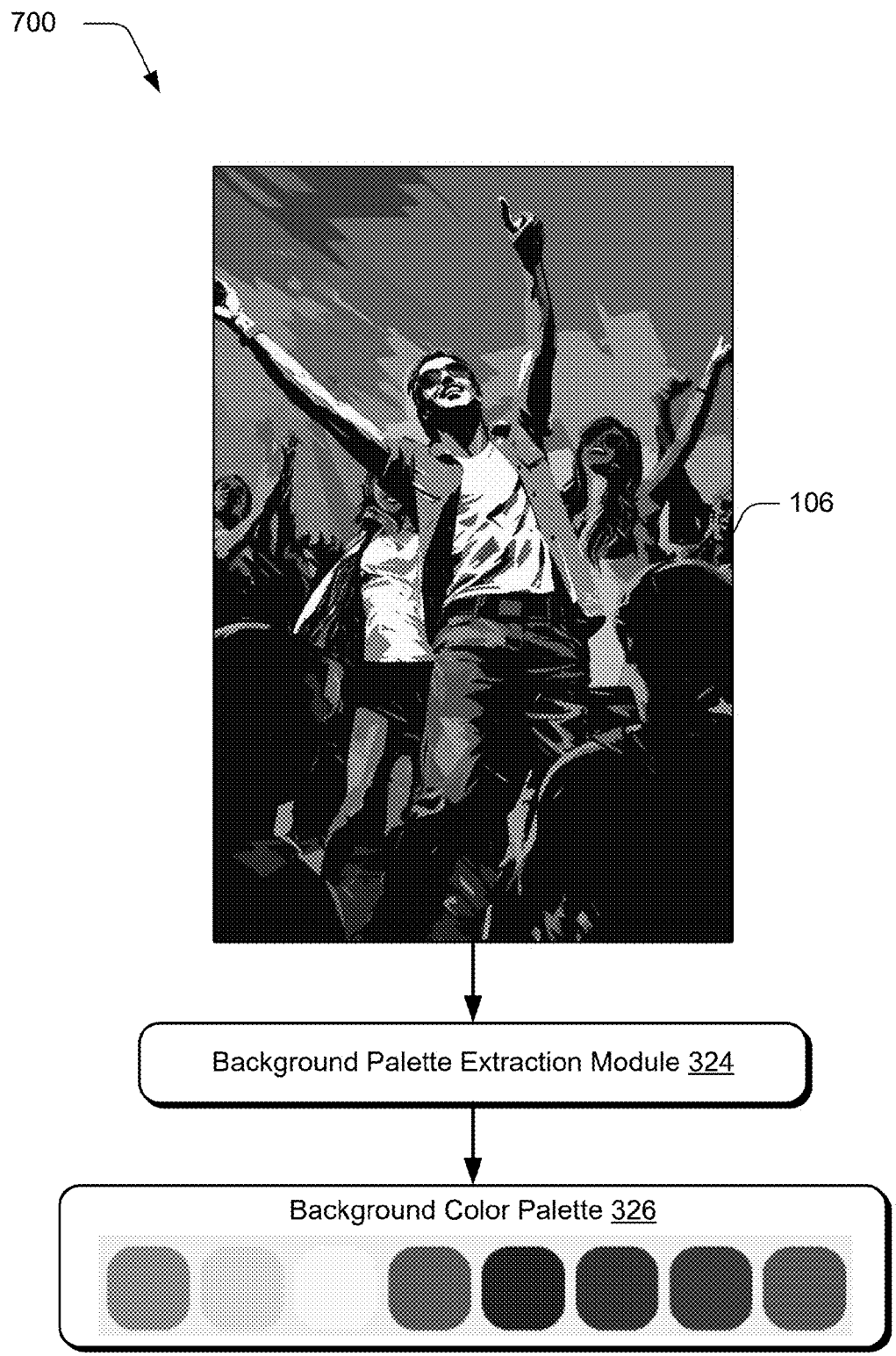
FIG. 7 depicts a system in an example implementation showing operation of the background palette extraction module in greater detail as extracting a background color palette from a digital image.

FIG. 7 depicts a system 700 in an example implementation showing operation of the background palette extraction module 324 in greater detail as extracting the background color palette 326 from the digital image 106. The background palette extraction module 324, for instance, first downscales the digital image 106 by a specified factor in "X" and "Y" dimensions, e.g., a factor of four.

The digital image 106 is also converted into a HSB color space from an RGB color space. Pixels of the converted image are sorted based on hue values, and a hue circle is divided in "n" equal parts of "360/n" degrees. Each of the pixels is assigned to one of the sectors, and a median color is returned from each sector as forming the background color palette 326. In testing, it has been found that "n=eight" achieves desirable results, although other examples are also contemplated.

The complementary hue 318 and the background color palette 326 are then provided as an input to a hue selection module 328 to select a hue from the background color palette 326 (illustrated as selected hue 330) based on the complementary hue 318. A legibility adjustment module 332 is configured to adjust the selected hue 330, e.g., based on brightness of the digital image 106 using a brightness adjustment module 334, saturation of the digital image 106 by a saturation adjustment module 336, and so on.

Figure 8:
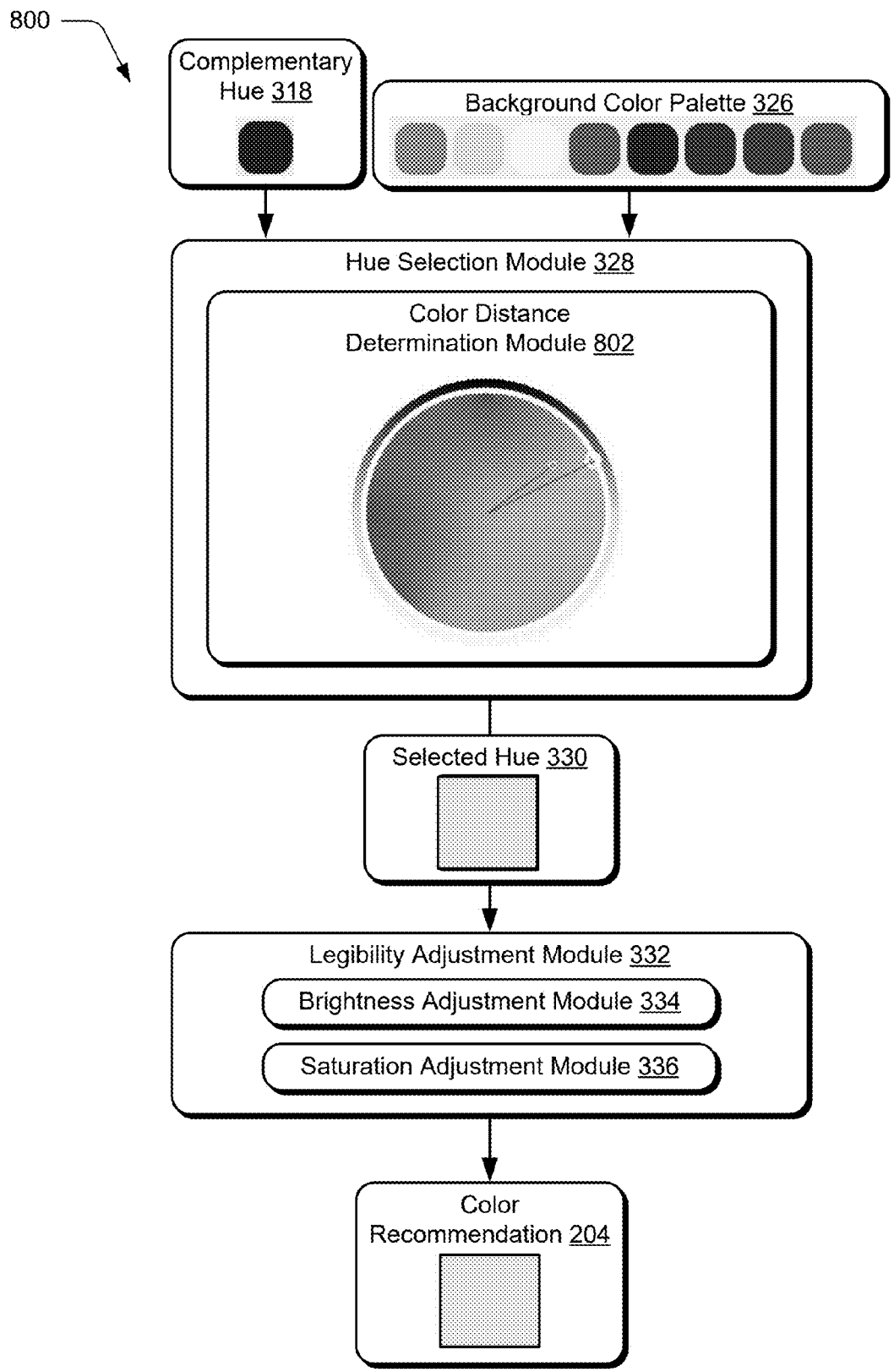
FIG. 8 depicts a system in an example implementation showing operation of a hue selection module and a legibility adjustment module in greater detail as selecting a hue from the background color palette and adjusting the selected hue to form the color recommendation.

FIG. 8 depicts a system 800 in an example implementation showing operation of the hue selection module 328 and the legibility adjustment module 332 in greater detail as selecting a hue from the background color palette and adjusting the selected hue to form the color recommendation 204. The hue selection module 328 is configured to select a hue from the background color palette 326 having a minimum hue distance between itself and the complementary hue 318 selected from the complementary color palette 314.

The hue selection module 328, for instance, employs a color distance determination module 802 to determine a color distance (block 1014) between a complementary hue selected from the complementary color palette (e.g., complementary hue 318) and respective hues of the background color palette 326. To do so, the color distance determination module 802 computes the color distance as a minimum angular distance between the complementary hue 318 and respective hues of the background color palette 326, e.g., using a color wheel as illustrated. In this way, the selected hue 330 from the background color palette 326 promotes harmonization with the digital image 106, which is not possible in conventional techniques.

The selected hue 330 ensures hue contrast with respect to the portion 306 and hue harmonization with respect to the digital image 106 as a whole. The legibility adjustment module 332 is then employed to adjust the color recommendation (e.g., the selected hue 330 in this example) based on brightness or saturation of the digital image 106 (block 1016) to support sufficient contrast and therefore visibility of the object with respect to the portion 306.

The brightness adjustment module 334, for instance, is configured to determine an average brightness of each of the pixel colors in an HSB color space for the portion 306. Likewise, the saturation adjustment module 336 is configured to determine an average saturation of each of the pixel colors in the HSB color space.

The legibility adjustment module 332 may then employ legibility curves, e.g., computed from a corpus of templates. The legibility curves are usable by the legibility adjustment module 332 to determine appropriate values of brightness and/or saturation of the object (e.g., text) as a function of brightness and/or saturation of the portion 306, over which, the object is to be displayed. Use of legibility curves has been shown in real world scenario to support increased computational efficiency, e.g., as compared with use of machine-learning models that may be susceptible to overfitting due to limited amounts of training data.

The legibility adjustment module 332, for instance, may employ a brightness adjustment by the brightness adjustment module 334 as follows:

$$b = 1 - (1 - alphaB) * b^2$$

Similarly, the legibility adjustment module 332 may employ a saturation adjustment by the saturation adjustment module 336 as follows:

$$s = 1 - (1 - alphaS) * s^2$$

The legibility adjustment module 332 is further configurable to employ a brightness constraint on saturation through use of a respective legibility curve. This curve imposes a constraint on object saturation (e.g., text) based on brightness exhibited by the portion 306. For portions having a lower brightness, highly saturated colors drastically diminish legibility. Accordingly, this constraint is usable to account for these low brightness colors by generating slightly tinted light colors as follows:

$$s' \leq 0.2 + 0.8 \times \sqrt{b},$$

Accordingly, the adjusted selected hue 330 in this example is output by the color legibility recommendation module 202 as the color recommendation 204.

Figure 9:
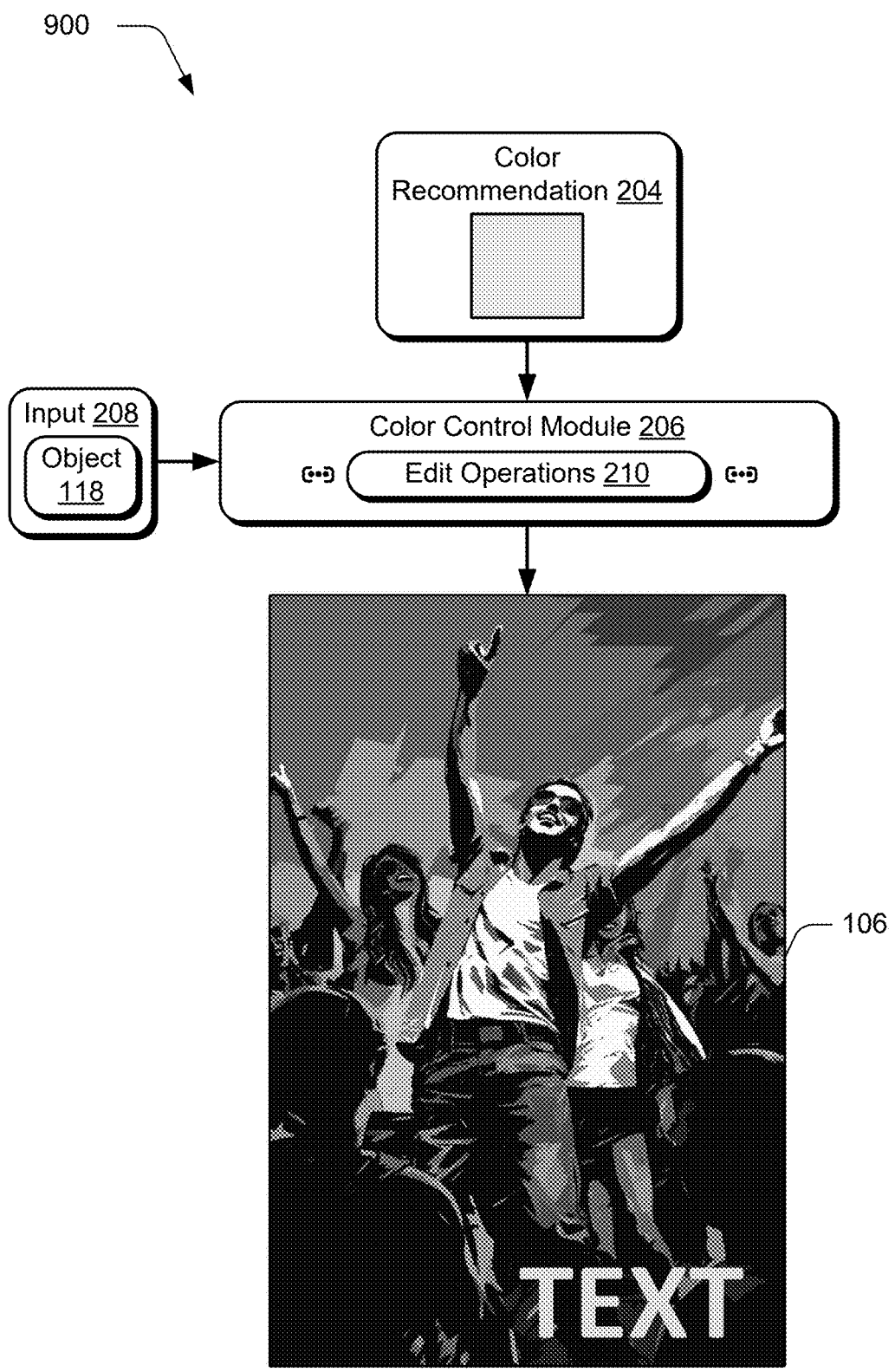
FIG. 9 depicts a system in an example implementation showing operation of the color control module of FIG. 2 in greater detail as controlling color of an object based on a color recommendation.

The color recommendation 204 is then usable as a basis to control one or more edit operations 210 by a color control module 206. FIG. 9 depicts a system 900 in an example implementation showing operation of the color control module 206 of FIG. 2 in greater detail as controlling color of an object 118 based on a color recommendation 204. An input 208, for instance, is received with respect to an object 118 (block 1018), e.g., to input "TEXT" in the illustrated example. The object 118 is then presented as having a color based on the color recommendation 204 in the portion 306 of the digital image 106 (block 1020). The object 118 has a color that promotes contrast with a respective portion 306 of the digital image 106, over which, the object 118 is displayed as well as promotes visual harmony with the digital image 106, which is not possible in conventional techniques.

In this way, the visibility color recommendation system 116 generates a color recommendation 204, automatically and without user intervention, selected from the digital image 106 (e.g., a background of the digital image) that promotes visibility of the object 118 (e.g., text) with respect to the selected portion of the digital image. The color recommendation 204 may be generated by the visibility color recommendation system in real time, and as such, support a variety of functionalities that are not possible in conventional techniques.

Example System and Device

Figure 11:
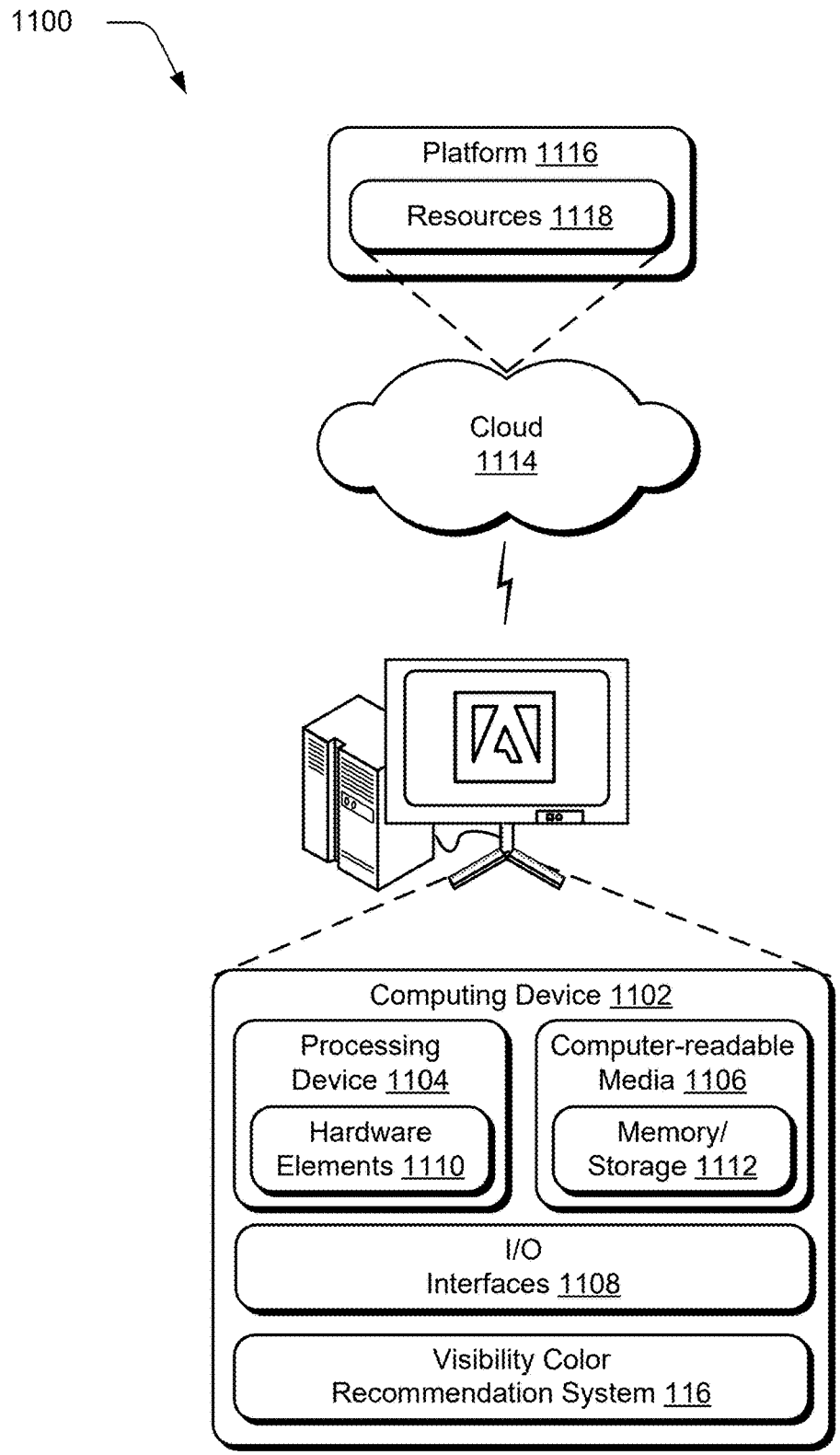
FIG. 11 illustrates an example system including various components of an example device that can be implemented as any type of computing device as described and/or utilize with reference to the previous figures to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the visibility color recommendation system 116. The computing device 1102 is configurable, for example, as a server of a service provider, a device associated with a client (e.g., a client device), an on-chip system, and/or any other suitable computing device or computing system.

The example computing device 1102 as illustrated includes a processing device 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1104 is representative of functionality to perform one or more operations using hardware. Accordingly, the processing device 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112 that stores instructions that are executable to cause the processing device 1104 to perform operations. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing device 1104. The instructions and/or functions are executable/operable by one or more articles of manufacture (for example, one or more computing devices 1102 and/or processing devices 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

In implementations, the platform 1116 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a user input defining a glyph to be displayed along with a digital image in a user interface;
generating, by the processing device, a color recommendation automatically and without user intervention based on visibility of the glyph with respect to one or more colors of the digital image, the generating including:
extracting a background color palette from the digital image; and
determining a color distance between a complementary hue selected from a complementary color palette and respective hues of the background color palette based on angular deviation between hues on a color wheel; and
presenting, by the processing device, the glyph in the user interface as having a color from the digital image based on the color recommendation.

2. The method as described in claim 1, wherein the glyph includes alphanumeric text, a punctuation mark, a symbol, or an emoji.

3. The method as described in claim 1, wherein the generating includes:
receiving an input defining a portion of the digital image that is to be used to display the glyph; and
extracting an input color palette including one or more hues included in the portion,
wherein the color recommendation is based at least in part of the input color palette.

4. The method as described in claim 3, wherein the generating includes generating the complementary color palette based on the input color palette and wherein the color recommendation is based on the complementary color palette.

5. The method as described in claim 4, wherein the generating includes detecting the complementary hue from the complementary color palette and wherein the color recommendation is based on the complementary hue.

6. The method as described in claim 5, wherein the generating includes extracting the background color palette from the digital image and locating a hue from the background color palette based on the complementary hue detected from the complementary color palette and wherein the color recommendation is based on the located hue.

7. The method as described in claim 1, wherein the generating of the color recommendation includes adjusting the color recommendation based on brightness or saturation of the digital image.

8. A system comprising:
a processing device; and
a computer-readable storage medium storing instructions that, responsive to execution by the processing device, causes the processing device to perform operations including:
detecting movement of an object in a user interface to a portion of a digital image
determining a complementary color palette based on hues included in the portion of the digital image;
extracting a background color palette through use of the digital image as a background;
generating a color recommendation specifying a color, automatically and without user intervention, based on a comparison of a complementary hue of the complementary color palette and a background hue of the background color palette; and
displaying the object in the portion of the digital image having the color automatically and without user intervention, based on the color recommendation in the portion of the digital image.

9. The system as described in claim 8, wherein the background color palette includes the background hue as independent of hues included in an input color palette extracted from the portion of the digital image and used as a basis for the determining of the complementary color palette.

10. The system as described in claim 8, wherein the color is based on a respective said hue included in the background color palette.

11. The system as described in claim 10, wherein the background color palette is generated based on colors within borders of the digital image as a whole.

12. The system as described in claim 8, wherein the object is a raster object or a vector object.

13. One or more computer-readable storage media storing instructions that, responsive to execution by a processing device, causes the processing device to perform operations including:
- presenting an object for display in a user interface with respect to a first portion in a digital image, the object having a first color generated, automatically and without user intervention, based on visibility of the first color with respect to the first portion;
- detecting movement of the object in the user interface from the first portion to a second portion of the digital image;
- determining a complementary color palette based on hues included in the second portion of the digital image;
- extracting a background color palette through use of the digital image as a background;
- generating a color recommendation specifying a color, automatically and without user intervention, based on a comparison of a complementary hue of the complementary color palette and a background hue of the background color palette; and
- presenting the object for display in the user interface with respect to the second portion having a second color generated, automatically and without user intervention, based on the color recommendation for visibility of the second color with respect to the second portion.

14. The one or more computer-readable storage media as described in claim 13, wherein the first color and the second color are generated based on the background color palette extracted from the digital image.

15. The one or more computer-readable storage media as described in claim 13, wherein the object is a raster object, a vector object, or a glyph.

16. The one or more computer-readable storage media as described in claim 13, wherein the first color and the second color are generated based on extracting input color palettes including one or more hues included in the first portion and the second portion, respectively.

17. The one or more computer-readable storage media as described in claim 16, wherein the generating includes generating the complementary color palette based on one or more of the input color palettes.

18. The one or more computer-readable storage media as described in claim 13, wherein the first and second colors are generated by determining a color distance between a complementary hue selected from the complementary color palettes and respective hues of the background color palette generated from the digital image.

19. The one or more computer-readable storage media as described in claim 13, wherein the presenting the object for display in the user interface with respect to the second portion includes extracting the background color palette from the second portion and wherein the second color is further based on the background color palette.

20. The one or more computer-readable storage media as described in claim 19, further comprising determining a color distance between a complementary hue selected from the complementary color palette and respective hues of the background color palette based on angular deviation between hues on a color wheel.

\* \* \* \* \*